(12) United States Patent
Dawley (10) Patent No.: US 11,011,803 B2
(45) Date of Patent: May 18, 2021

(54) CONNECTION ASSEMBLY FOR A BATTERY PACK ASSEMBLY, THE BATTERY PACK ASSEMBLY, AND A METHOD OF ASSEMBLING THE BATTERY PACK ASSEMBLY

(71) Applicant: GM Global Technology Operations LLC, Detroit, MI (US)

(72) Inventor: Evan J. Dawley, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 84 days.

(21) Appl. No.: 16/397,122

(22) Filed: Apr. 29, 2019

(65) Prior Publication Data
US 2020/0343513 A1    Oct. 29, 2020

(51) Int. Cl.
*H01M 2/00* (2006.01)
*H01M 50/502* (2021.01)
*H01M 10/42* (2006.01)

(52) U.S. Cl.
CPC ........ *H01M 50/502* (2021.01); *H01M 10/425* (2013.01); *H01M 2220/20* (2013.01)

(58) Field of Classification Search
CPC ............... H01M 2/206; H01M 10/425; H01M 2220/20; H01M 50/502
See application file for complete search history.

(56) References Cited

U.S. PATENT DOCUMENTS

| | | | |
|---|---|---|---|
| 8,398,726 B2 * | 3/2013 | Yamagami | B29C 45/14639 29/623.2 |
| 2014/0003016 A1 * | 1/2014 | McCabe | H05K 1/0271 361/776 |
| 2014/0299373 A1 * | 10/2014 | Nakamura | H02G 5/06 174/74 R |
| 2017/0338520 A1 * | 11/2017 | Lim | H01R 25/165 |

* cited by examiner

*Primary Examiner* — Nicholas P D'Aniello
(74) *Attorney, Agent, or Firm* — Quinn IP Law (57) ABSTRACT

A connection assembly includes a busbar defining a first hole, and a circuit board defining a second hole that aligns with the first hole. A battery pack assembly includes the connection assembly. The connection assembly includes a pin having a first body portion and a second body portion. The first body portion is disposed in the first hole and the second body portion is disposed in the second hole. The first body portion defines a first eyelet to allow the first body portion to flex as the first body portion engages the busbar inside the first hole. The second body portion defines a second eyelet to allow the second body portion to flex as the second body portion engages the circuit board inside the second hole. A method of assembling the battery pack assembly includes a first material molded to the busbar to form a frame attached to the busbar.

20 Claims, 3 Drawing Sheets

CONNECTION ASSEMBLY FOR A BATTERY PACK ASSEMBLY, THE BATTERY PACK ASSEMBLY, AND A METHOD OF ASSEMBLING THE BATTERY PACK ASSEMBLY

INTRODUCTION

Electric vehicles and hybrid vehicles include a battery pack to supply power to drive one or more wheels of the vehicle during certain modes of operation. The battery pack may include a busbar secured to cells of a battery. The battery pack may also include a circuit board secured to the busbar.

SUMMARY

The present disclosure provides a connection assembly for a battery pack assembly including a battery cell. The connection assembly includes a busbar configured to be electrically connected to the battery cell. The busbar defines a first hole. The connection assembly includes a circuit board defining a second hole that aligns with the first hole. The connection assembly further includes a pin. The pin includes a first body portion having a first end and a second end, and a second body portion having a first end and a second end. The first body portion is disposed in the first hole and the second body portion is disposed in the second hole. The first body portion defines a first eyelet between the first and second ends of the first body portion to allow the first body portion to flex as the first body portion engages the busbar inside the first hole. The second body portion defines a second eyelet between the first and second ends of the second body portion to allow the second body portion to flex as the second body portion engages the circuit board inside the second hole.

The present disclosure also provides a battery pack assembly including a battery cell. The battery pack assembly includes a frame coupled to the battery cell. The battery pack assembly also includes the connection assembly, discussed above, mounted to the frame. The connection assembly includes a busbar attached to the frame and a circuit board attached to the frame.

The present disclosure also provides a method of assembling the battery pack assembly. A first material is molded to a busbar to form a frame attached to the busbar. A first body portion of a pin is inserted into a first hole of the busbar. The first body portion flexes into engagement with the busbar inside the first hole due to a first eyelet defined in the first body portion. A shoulder of the pin engages the frame to maintain a position of the pin relative to the busbar once the first body portion of the pin is inserted into the first hole. A circuit board is positioned relative to the frame such that a second body portion of the pin is disposed into a second hole of the circuit board. The second body portion flexes into engagement with the circuit board inside the second hole due to a second eyelet defined in the second body portion.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Figure 1:
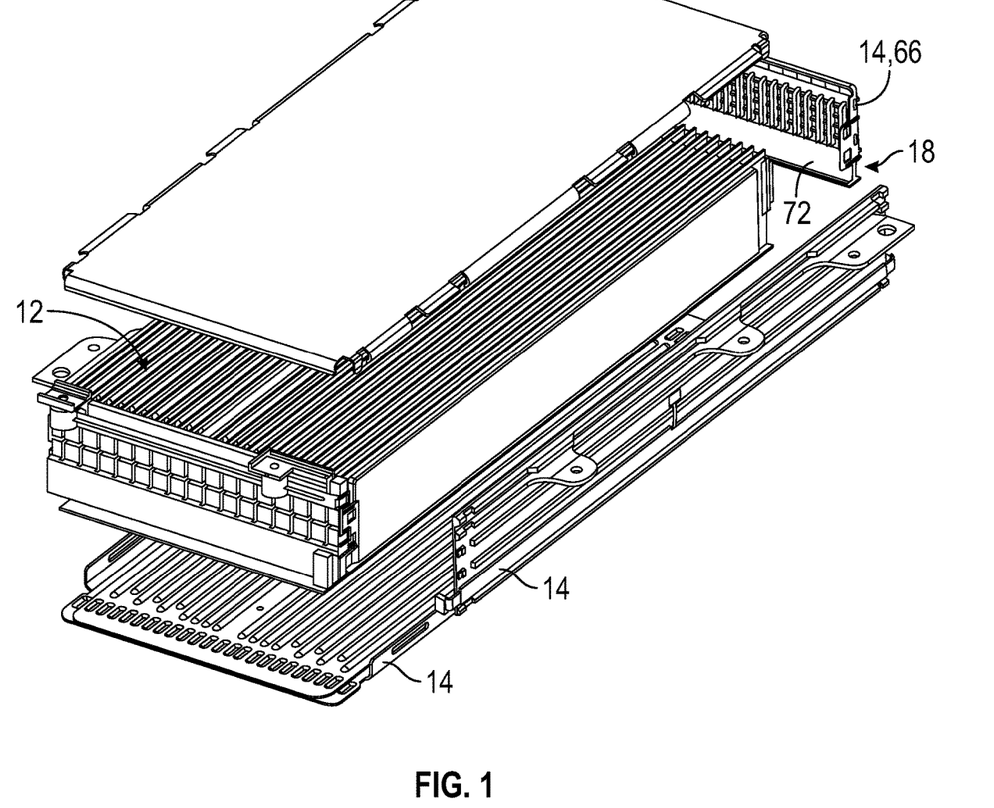
FIG. 1 is a schematic perspective exploded view of a battery pack assembly and a connection assembly.

Referring to the FIGS., wherein like numerals indicate like or corresponding parts throughout the several views, a battery pack assembly 10 is generally shown in FIG. 1. The battery pack assembly 10 may also be referred to as a battery module or battery module assembly. One or more battery pack assemblies 10 or battery modules may be electrically connected together to provide the desired voltage to operate various components. The below discussion refers to one battery pack assembly 10, but it is to be appreciated that any suitable number of battery pack assemblies 10 may be used, and be configured as discussed below.

The battery pack assembly 10 may be used in a vehicle, such as, but not limited to, an automobile, an off-road vehicle, a watercraft, an aircraft or any other suitable movable platform. As non-limiting examples, the vehicle may be a hybrid vehicle or an electric vehicle. The hybrid vehicle may include an internal combustion engine and one or more electric motors to drive wheels of the vehicle. The electric vehicle may include one or more electric motors to drive the wheels of the vehicle. The battery pack assembly 10 may store power and/or provide power to operate the electric motors that drive the wheels of the vehicle. As another example, the battery pack assembly 10 may store power and/or provide power to various auxiliary systems, such as a radio, one or more pumps, lights, etc. The battery pack assembly 10 may also be used in a non-vehicle system, such as, a power plant, etc.

Referring to FIG. 1, the battery pack assembly 10 includes a battery cell 12. The battery cell 12 may be configured to store power and/or provide power to the various components, some of which as discussed above. In certain configurations, the battery pack assembly 10 may include a plurality of the battery cells 12 electrically connected to each other, and configured to store power and/or provide power to the various components. The battery cells 12 may be any suitable configuration, and include any suitable material(s) to store power.

Figure 2:
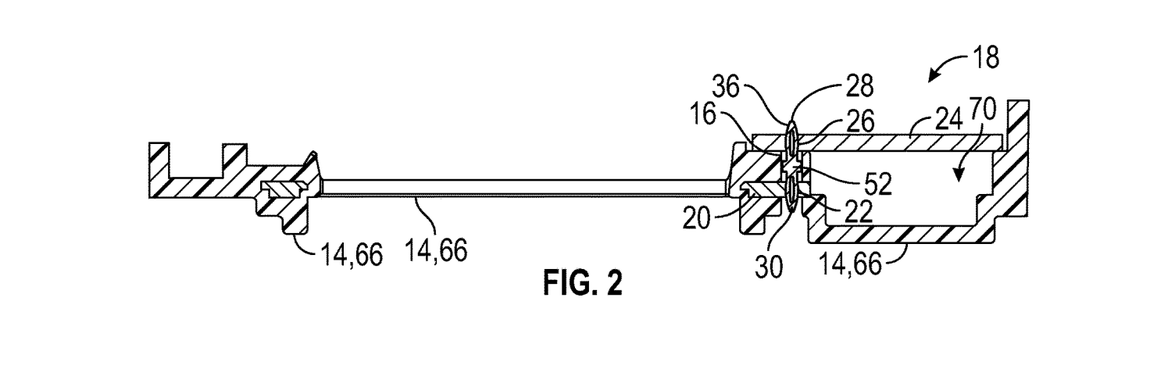
FIG. 2 is a schematic cross-sectional view of the connection assembly that includes a frame, a busbar, a circuit board, and a pin.
Figure 3:
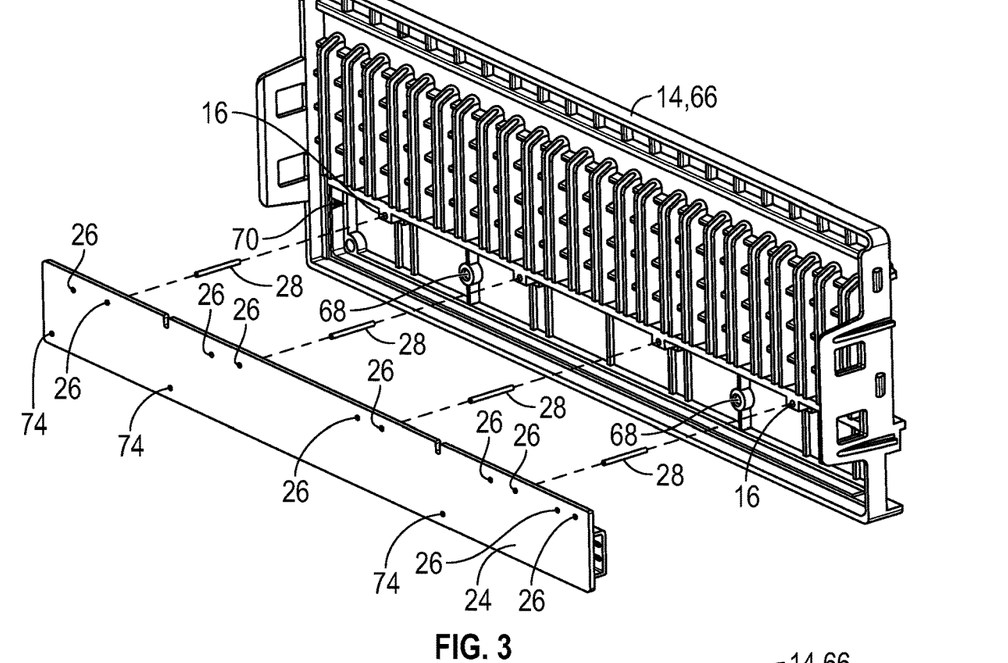
FIG. 3 is a schematic perspective exploded view of the frame and the circuit board, with schematic boxes indicating the location that a plurality of the pins aligns relative to the frame and the circuit board.

As best shown in FIGS. 1-3, the battery pack assembly 10 may include a frame 14 coupled to the battery cell 12. The frame 14 may define one or more apertures 16. When the frame 14 defines a plurality of the apertures 16, the apertures 16 are spaced from each other. The battery pack assembly 10 may include a plurality of frames 14 that cooperate to contain the battery cell(s) 12 and other battery pack components, some of which are discussed below. Some of the frames 14 may be configured the same or differently from each other.

The present disclosure provides a connection assembly 18 (various pieces shown in FIGS. 1-6) for the battery pack assembly 10, and the connection assembly 18 provides compact packaging which saves space. In certain configurations, the battery pack assembly 10 may include the connection assembly 18. The connection assembly 18 may be mounted to the frame 14 in certain configurations. The connection assembly 18 is compatible with different battery module configurations, thus creating a cost savings. As mentioned above, more than one frame 14 may contain the battery cell(s) 12, and therefore, some of the frames 14 may not include the connection assembly 18 as shown in FIG. 1. It is to be appreciated that more than one of the frames 14 may include the connection assembly 18.

Figure 4:
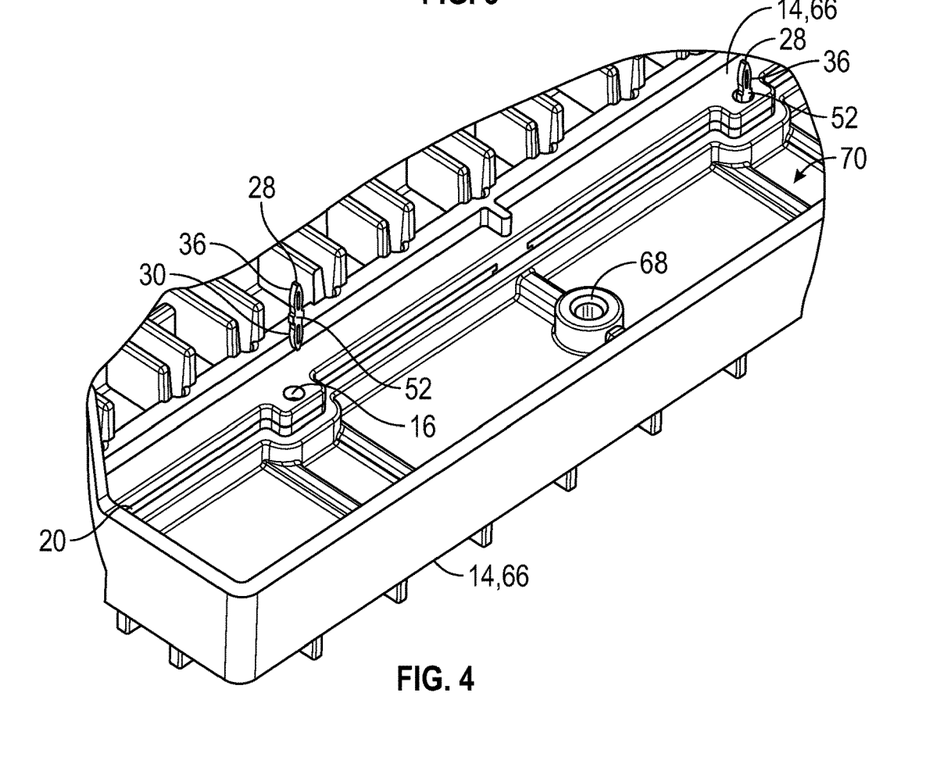
FIG. 4 is a schematic fragmentary perspective view of the frame and the busbar, with one of the pins exploded from one aperture of the frame and another one of the pins positioned in one of the apertures of the frame.

Referring to FIGS. 2 and 4, the connection assembly 18 includes a busbar 20 that is used to electrically connect various components, such as the battery cells 12 and other components, some of which are discussed below. Therefore, the busbar 20 may be configured to be electrically connected to the battery cell(s) 12. Specifically, for example, the busbar 20 forms a cell-to-cell connection of the battery cell(s). Hence, the busbar 20 facilitates either a series cell-to-cell circuit or a parallel cell-to-cell circuit. In certain configurations, the busbar 20 may be attached to the frame 14. The busbar 20 may be attached to the frame 14 via various methods, and non-limiting examples may include molding, fastening, snapping, etc. It is to be appreciated that the busbar 20 may be any suitable configuration.

As best shown in FIGS. 2 and 4, the busbar 20 defines a first hole 22. Furthermore, in certain configurations, the busbar 20 may define a plurality of the first holes 22 spaced from each other. The aperture 16 of the frame 14 aligns with the first hole 22 of the busbar 20. In certain configurations, when more than one of the apertures 16 and more than one of the first holes 22 are being used, each of the apertures 16 aligns with respective one of the first holes 22 (see FIG. 4).

As best shown in FIGS. 2-4, the connection assembly 18 includes a circuit board 24 that is used to control, measure, and/or monitor various components within the battery module. For example, the circuit board 24 may control, measure, and/or monitor the battery cells 12 and/or other electrical interfaces. The circuit board 24 may be a printed circuit board (PCB), etc., and the circuit board 24 may be with or without wireless communications and/or state of charge estimation, etc. Furthermore, the circuit board 24 may be with or without a surface mounted device (SMD). The connection assembly 18 discussed herein uses the same circuit board 24 that is compatible with different battery module configurations, which provides a cost savings.

Referring to FIGS. 2 and 3, the circuit board 24 defines a second hole 26 that aligns with the first hole 22 of the busbar 20. The circuit board 24 and the busbar 20 at least partially overlap to provide the alignment of the first and second holes 22, 26. For example, in the FIGS., the circuit board 24 and the busbar 20 are spaced apart and overlap one on top of the other. The pin 28 connection between the circuit board 24 and the busbar 20 provide a partial overlap of the circuit board 24 and the bus bar which allows a larger area to populate components on the circuit board 24.

In certain configurations, the circuit board 24 may be attached to the frame 14, which is discussed further below. Furthermore, in certain configurations, the circuit board 24 may define a plurality of the second holes 26 spaced from each other. In certain configurations, when more than one of the first holes 22 and the second holes 26 are being used, each of the first holes 22 of the busbar 20 aligns with respective one of the second holes 26 of the circuit board 24.

As mentioned above, the same circuit board 24 may be used, and to allow such implementation, additional second holes 26 may be defined in the circuit board 24 that are not used for all of the battery module configurations. As such, some of the second holes 26 may not be used in various battery module configurations.

Turning to FIGS. 2-5, the connection assembly 18 includes a pin 28. The pin 28 connects together the busbar 20 and the circuit board 24, and more specifically, the pin 28 electrically connects the busbar 20 and the circuit board 24. The pin 28 provides the ability to connect the busbar 20 and the circuit board 24 without having to solder the busbar 20 and the circuit board 24 together. Furthermore, the pin 28 provides the ability to connect the busbar 20 and the circuit board 24 without having to use other mechanical connectors or fasteners to connect together the busbar 20 and the circuit board 24.

Figure 5:
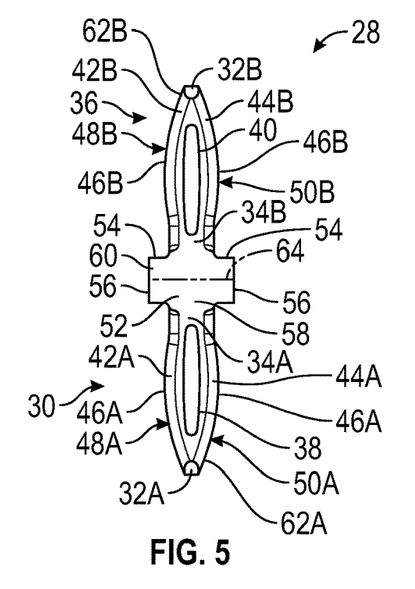
FIG. 5 is a schematic side view of the pin of FIG. 2, and the pins that may be disposed in the schematic boxes of FIG. 3.
Figure 6:
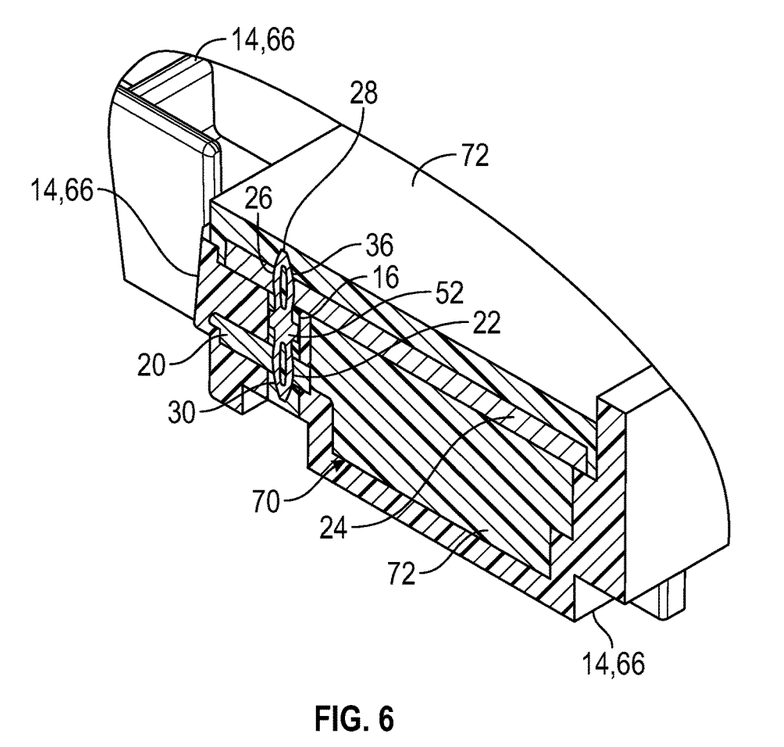
FIG. 6 is a schematic fragmentary cross-sectional view of the frame, the busbar, the pin, and the circuit board, with a molding material filling the spaces around the frame, the busbar, the pin, and the circuit board.

As best shown in FIG. 5, the pin 28 is designed to be double-sided to connect together the busbar 20 and the circuit board 24. The pin 28 includes a first body portion 30 having a first end 32A and a second end 34A. Additionally, the pin 28 includes a second body portion 36 having a first end 32B and a second end 34B. The first body portion 30 is disposed in the first hole 22 (of the busbar 20) and the second body portion 36 is disposed in the second hole 26 (of the circuit board 24). In certain configurations, the first and second body portions 30, 36 are a mirror image of each other. In other configurations, the first and second body portions 30, 36 may be different configurations from each other. The configurations of the first and second body portions 30, 36 may be tailored to the desired installation force and/or desired retention force.

The first and second body portions 30, 36 are configured to be compliant. By designing the pin 28 to be compliant, the desired engagements between the first body portion 30 and the busbar 20, and the second body portion 36 and the circuit board 24, may be achieved to ensure electrical connections therebetween. Continuing with FIG. 5, the first body portion 30 defines a first eyelet 38 between the first and second ends 32A, 34A of the first body portion 30 to allow the first body portion 30 to flex as the first body portion 30 engages the busbar 20 inside the first hole 22. The second body portion 36 defines a second eyelet 40 between the first and second ends 32B, 34B of the second body portion 36 to allow the second body portion 36 to flex as the second body portion 36 engages the circuit board 24 inside the second hole 26. The first and second eyelets 38, 40 may be the same configuration or different configurations from each other. The first and second body portions 30, 36 flex to ensure sufficient contact between the pin 28 and the busbar 20 and the circuit board 24.

Continuing with FIG. 5, the first body portion 30 may include a first arm 42A and a second arm 44A connected to each other at the first and second ends 32A, 34A of the first body portion 30. Generally, the first and second arms 42A, 44A of the first body portion 30 surround the first eyelet 38. More specifically, the first and second arms 42A, 44A of the first body portion 30 surround the first eyelet 38 relative to a pair of opposing movable sides 46A of the first body portion 30. In certain configurations, the first and second arms 42A, 44A of the first body portion 30 completely surround the first eyelet 38 relative to the movable sides 46A of the first body portion 30. Therefore, the first and second arms 42A, 44A of the first body portion 30 close the first eyelet 38 relative to the movable sides 46A of the first body portion 30.

Continuing with FIG. 5, the first arm 42A of the first body portion 30 may include a first outer surface 48A and the second arm 44A of the first body portion 30 may include a second outer surface 50A opposing the first outer surface 48A of the first body portion 30. Therefore, the first and second outer surfaces 48A, 50A of the first body portion 30 are disposed along the respective movable sides 46A of the first body portion 30. The first and second outer surfaces 48A, 50A of the first body portion 30 bow outwardly away from each other between the first and second ends 32A, 34A of the first body portion 30. In other words, the first and second outer surfaces 48A, 50A of the first body portion 30 taper, curve, etc., outwardly away from the first eyelet 38 as the surfaces move away from the respective first and second ends 32A, 34A of the first body portion 30.

Again continuing with FIG. 5, the second body portion 36 may include a first arm 42B and a second arm 44B connected to each other at the first and second ends 32B, 34B of the second body portion 36. Generally, the first and second arms 42B, 44B of the second body portion 36 surround the second eyelet 40. More specifically, the first and second arms 42B, 44B of the second body portion 36 surround the second eyelet 40 relative to a pair of opposing movable sides 46B of the second body portion 36. In certain configurations, the first and second arms 42B, 44B of the second body portion 36 completely surround the second eyelet 40 relative to the movable sides 46B of the second body portion 36. Therefore, the first and second arms 42B, 44B of the second body portion 36 close the second eyelet 40 relative to the movable sides 46B of the second body portion 36.

Continuing with FIG. 5, the first arm 42B of the second body portion 36 may include a first outer surface 48B and the second arm 44B of the second body portion 36 may include a second outer surface 50B opposing the first outer surface 48B of the second body portion 36. Therefore, the first and second outer surfaces 48B, 50B of the second body portion 36 are disposed along the respective movable sides 46B of the second body portion 36. The first and second outer surfaces 48B, 50B of the second body portion 36 bow outwardly away from each other between the first and second ends 32B, 34B of the second body portion 36. In other words, the first and second outer surfaces 48B, 50B of the second body portion 36 taper, curve, etc., outwardly away from the second eyelet 40 as the surfaces move away from the respective first and second ends 32B, 34B of the second body portion 36.

As best shown in FIG. 5, the pin 28 may include an intermediate portion 52 disposed between the first and second body portions 30, 36. Generally, the first and second eyelets 38, 40 spaced from the intermediate portion 52. The intermediate portion 52 may be used to install the pin 28, and/or the intermediate portion 52 may engage the frame 14 inside the aperture 16 to maintain the position of the pin 28 relative to the busbar 20 and/or the circuit board 24. Additionally, the intermediate portion 52 may also act as a stop, in which the intermediate portion 52 engages the busbar 20 to prevent further insertion of the pin 28 through the busbar 20.

Referring to FIGS. 2 and 5, the intermediate portion 52 may include a shoulder 54 disposed between the busbar 20 and the circuit board 24 when the first body portion 30 is disposed in the first hole 22 of the busbar 20 and the second body portion 36 is disposed in the second hole 26 of the circuit board 24. The shoulder 54 engages the frame 14 to position the pin 28 relative to the first hole 22. Additionally, the shoulder(s) 54 may also act as a stop, in which the shoulder(s) 54 engage the busbar 20 to prevent further insertion of the pin 28 through the busbar 20. Furthermore, the shoulder 54 provides a way to grab the pin 28 and install the pin 28. The shoulder 54 may be any suitable configuration, and may be tailored for tooling and force monitoring purposes.

In certain configurations, the shoulder 54 is further defined as a plurality of shoulders 54 spaced apart and opposing each other. As such, the shoulders 54 may be disposed between and extend outwardly in the same direction as the movable sides 46A, 46B of the first and second body portions 30, 36. In this configuration, one of the shoulders 54 is disposed between the first arm 42A of the first body portion 30 and the first arm 42B of the second body portion 36. Additionally, in this configuration, another one of the shoulders 54 is disposed between the second arm 44A of the first body portion 30 and the second arm 44B of the second body portion 36.

Each of the shoulders 54 may include an outer periphery 56 that faces outwardly away from the intermediate portion 52. More specifically, the outer periphery 56 of each of the shoulders 54 faces part of the frame 14 inside the aperture 16. Therefore, the outer periphery 56 of the shoulders 54 may engage the frame 14 inside the aperture 16 when the pin 28 is installed.

Referring to FIG. 5, the pin 28 may include a pair of flat sides 58 spaced apart and opposing each other. The movable sides 46A, 46B are disposed between the respective flat sides 58 around the outside of the pin 28. The flat sides 58 may extend along the first and second body portions 30, 36 and the intermediate portion 52. The flat sides 58 along the first body portion 30 may engage the busbar 20 inside the first hole 22, the flat sides 58 along the second body portion 36 may engage the circuit board 24 inside the second hole 26, and the flat sides 58 along the intermediate portion 52 may engage the frame 14 inside the aperture 16.

The flat sides 58 may present a flat surface having a different configuration than the first and second outer surfaces 48A, 48B, 50A, 50B of the first and second body portions 30, 36. The first and second arms 42A, 42B, 44A, 44B of the first and second body portions 30, 36 bow outwardly in a different direction from the flat sides 58. In other words, the flat surface of each of the flat sides 58 do not bow outwardly like the first and second outer surfaces 48A, 48B, 50A, 50B of the first and second body portions 30, 36. The flat surface of each of the flat sides 58 provides a surface to grab and install the pin 28.

The shoulders 54 extend outwardly from the intermediate portion 52 in a different direction from the flat sides 58. Therefore, opposing sides 60 of the shoulders 54 may present the flat sides 58 that provide a surface to grab and install the pin 28. The flat sides 58 along the shoulders 54 of the intermediate portion 52 may engage the frame 14 inside the aperture 16.

As discussed above, the pin 28 may electrically connect the busbar 20 and the circuit board 24. Therefore, the pin 28 may be formed of an electrically conductive material. As non-limiting examples, the pin 28 may be formed of copper, aluminum, nickel, tin, gold, silver, any other suitable conductive material(s) or combinations thereof.

The pin 28 may be completely formed of the electrically conductive material, in which the first and second body portions 30, 36 and the intermediate portion 52 are all formed of the same electrically conductive material. In other configurations, the pin 28 may be plated with the same material(s) or different materials.

If the pin 28 is plated, one type of material may be layered over the top of another type of material. As one non-limiting example, the pin 28 may be plated with nickel first and then followed by gold. The entire pin 28 may be plated or part of the pin 28 may be plated. Non-limiting examples of the plating materials of the pin 28 may include copper, aluminum, nickel, tin, gold, silver, any other suitable conductive material(s) or combinations thereof.

The first body portion 30 may be formed of a first pin material, and the second body portion 36 may be formed of a second pin material different from the first pin material. In certain configurations, the first body portion 30 has an outer surface 62A that may be formed of the first pin material, and the second body portion 36 has an outer surface 62B that may be formed of the second pin material different from the first pin material. The first and second pin materials may be any of the materials discussed above for the pin 28 and the plating materials. The first body portion 30 may be completely formed of the first pin material, including the outer surface 62A, and similarly, the second body portion 36 may be completely formed of the second pin material, including the outer surface 62B. As a non-limiting example, the first pin material may be aluminum, and thus, the first body portion 30 may be completely formed of aluminum; while the second pin material may be copper, and thus, the second body portion 36 may be completely formed of copper.

Furthermore, the outer surface 62A of the first body portion 30 and/or the outer surface 62B of the second body portion 36 may be plated with different material. Therefore, the first body portion 30 may be plated with the first pin material, and the second body portion 36 may be plated with the second pin material different from the first pin material. As a non-limiting example, the outer surface 62A of the first body portion 30 may be a nickel plating, and the outer surface 62B of the second body portion 36 may be a nickel and gold plating.

In other configurations, the first and second pin materials of the first and second body portions 30, 36 are the same material(s). Therefore, the outer surface 62A of the first body portion 30 and/or the outer surface 62B of the second body portion 36 may be plated with the same material. As a non-limiting example, the outer surface 62A of the first body portion 30 may be a nickel plating, and the outer surface 62B of the second body portion 36 may also be a nickel plating.

When the pin 28 is formed of different materials whether plated or not, this may be referred to as a bimetal material construction or a clad material construction. The intermediate portion 52 of the pin 28 may have a transition zone 64 where the first and second pin materials end. Said differently, the transition zone 64 is where the first pin material of the first body portion 30 and the second pin material of the second body portion 30 transition at the intermediate portion 52. As a non-limiting example, if the first body portion 30 is completely formed of aluminum, and the second body portion 36 is completely formed of copper, the first and second pin materials transition at the transition zone 64. The transition zone 64 may be referred to as a bimetal transition zone which is present in a dovetail clad joint.

In certain configurations, the transition zone 64 may by where the plating material(s) transition. As a non-limiting example, if the first body portion 30 is plated, but the second body portion 36 is not plated, the plating of the first pin material ends at the transition zone 64. As another example, if the first and second body portions 30, 36 are plated with different materials, the plating of the first and second pin materials ends at the transition zone 64.

The first and second pin materials are generally selected to match the electrically conductive material(s) of the busbar 20 and the circuit board 24 respectively. Simply stated, the same electrically conductive materials are used for corresponding parts depending on the desired application. The first and second pin materials may be the same types of materials discussed above for the electrically conductive material, for example, copper, aluminum, tin, nickel, gold, silver, any other suitable conductive material(s) or combinations thereof. For example, if the busbar 20 is formed of aluminum, the first body portion 30 is formed of aluminum such that an aluminum-to-aluminum electrical connection is formed; and if an inner surface of the circuit board 24 that surrounds the second hole 26 of the circuit board 24 is formed of copper, the second body portion 36 is formed of copper such that a copper-to-copper electrical connection is formed. Thus, the bimetal material construction or combination of the plating of the pin 28 allow the coefficient of thermal expansion (CTE) of the first and second body portions 30, 36 of the pin 28 to match the respective busbar 20 and the circuit board 24.

The present disclosure also provides a method of assembling the battery pack assembly 10. A first material 66 (see FIG. 6) is molded to the busbar 20 to form the frame 14 attached to the busbar 20. Generally, the frame 14 will contain part of the busbar 20. The molding process also creates the aperture(s) 16 in the frame 14. The created frame 14 may present one or more inlets 68 and a recess 70, which are discussed below. In certain configurations, the busbar 20 is overmolded via the first material 66. It is to be appreciated that any suitable molding process may be used to create the frame 14 and the features of the frame 14. In other configurations, the busbar 20 may be attached to the frame 14 via fastening, joining, heatstaking, etc. Generally, the first material 66 is a non-conductive material, and as one non-limiting example, the non-conductive material may be one or more polymers. Once the first material 66 is attached to the busbar 20, the next step may be performed.

A tool grabs the pin 28 by the intermediate portion 52 after forming the frame 14 to the busbar 20. The tool may grab one or more shoulders 54 and/or the flat sides 58 along the intermediate portion 52. The tool then attaches the pin 28 to the busbar 20 and the frame 14. Specifically, the first body portion 30 of the pin 28 is inserted into the first hole 22 of the busbar 20. The first body portion 30 flexes into engagement with the busbar 20 inside the first hole 22 due to the first eyelet 38 defined in the first body portion 30. The flat sides 58 along the first body portion 30 may engage the busbar 20 inside the first hole 22.

The shoulder 54 of the pin 28 engages with the frame 14 to maintain a position of the pin 28 relative to the busbar 20 once the first body portion 30 of the pin 28 is inserted into the first hole 22. Specifically, the outer periphery 56 of the shoulders 54 may engage the frame 14 inside the aperture 16. Furthermore, the flat sides 58 along the shoulders 54 may engage the frame 14 inside the aperture 16. The shoulders 54 may act as a stop that engages the busbar 20 to position the pin 28 in the desired orientation during installation. Therefore, the intermediate portion 52 of the pin 28 is press fit, friction fit, interference fit, etc., to the frame 14 inside the aperture 16. The tool is removed after attaching the pin 28 to the frame 14. It is to be appreciated that more than one pin 28 may be installed in respective first holes 22 of the busbar 20 simultaneously via the tool. Hence, the tool may hold/position/insert more than one pin 28 at the same time.

Once the pin 28 is connected to the busbar 20 and the frame 14, then the circuit board 24 is attached to the pin 28. The circuit board 24 is positioned relative to the frame 14 such that the second body portion 36 of the pin 28 is disposed into the second hole 26 of the circuit board 24. The second hole 26 is plated to make the desired electrical connection between the pin 28 and the circuit board 24. The second body portion 36 flexes into engagement with the circuit board 24 inside the second hole 26 due to the second eyelet 40 defined in the second body portion 36. The circuit board 24 may lay on part of the frame 14 to overlap the recess 70 of the frame 14. When more than one pin 28 is installed, the circuit board 24 is simultaneously attached to each of the pins 28.

Next, another molding process or potting process seals the circuit board 24. A second material 72 (see FIG. 6) is molded around the circuit board 24 and the pin 28 such that the second material 72 fills the first and second holes 22, 26, which attaches the circuit board 24 to the frame 14. In certain configurations, the second material 72 fills the first and second eyelets 38, 40 of the pin 28 as well. The second material 72 may also fill the aperture(s) 16 of the frame 14. The second material 72 may be injected through the one or more inlets 68 of the frame 14 to fill the recess 70 between the frame 14 and the circuit board 24. The second material 72 may also be injected from above or along an edge of the circuit board 24. The second material 72 may be disposed over the top and/or bottom of the circuit board 24. Generally, the second material 72 is molded around the circuit board 24, the bus bar 20, and the pin 28 after the pin 28 is positioned into the second hole 26. Primarily, the second material 72 is molded around the circuit board 24. By molding the second material 72 around the pin 28, and optionally through the first and second eyelets 38, 40, this increases durability of the pin 28. The circuit board 24 may also define one or more openings 74 in which the second material 72 enters to further attach the circuit board 24 to the frame 14.

In certain configurations, the second material 72 is molded around the circuit board 24, the busbar 20, the pin 28 via a low pressure molding process. The low pressure molding process applies a low pressure to fill the spaces around the circuit board 24, the busbar 20, the pin 28, etc., to minimize undesirable forces being applied, for example, to the circuit board 24. The low pressure molding may use a pressure of about 50 kilopascal (kPa) to about 1000 kPa to inject the second material 72 around the circuit board 24, the busbar 20, the pin 28 to enclose these parts in the second material 72; again to minimize forces being applied to parts of the connection assembly 18. It is to be appreciated that any suitable molding process may be used to enclose or fill the desired spaces around the busbar 20, the circuit board 24, and the pin 28.

The second material 72 functions to mechanically adhere and protect the circuit board 24, components of the frame 14 and the pins 28. The second material 72 encloses the circuit board 24 to act as a seal that prevents liquid fluids from entering the circuit board 24. Therefore, for example, if coolant lines were in close proximity to the circuit board 24, any fluid leak would be prevented from reaching the circuit board 24 due to the circuit board 24 being sealed inside the second material 72.

Once the second material 72 cures, the connection assembly 18 is complete. The connection assembly 18 is a highly integrated low profile connection. Next, the battery cell 12 and the frame 14, with the connection assembly 18, are positioned relative to each other. More specifically, the frames 14 may be secured to each other with one side open to insert the battery cells 12. The battery cells 12 may be positioned relative to each other as a pre-assembled unit, and the battery cell unit is placed between the frames 14. The frame(s) 14 with the connection assembly 18 may be placed and secured to the battery cell unit by any suitable method, and non-limiting examples may include snap fit, fasteners, adhesive, welding, etc. The busbar 20 is electrically connected to the battery cell 12 (after the frame 14 is positioned relative to the battery cell unit). The busbar 20 may be electrically connected to one or more battery cells 12 by any suitable method, and non-limiting examples include laser welding, ultrasonic welding, resistance joining, etc. Then another frame 14 is secured to the other frames 14 along the opened side to close the battery module and encloses the battery cells 12.

It is to be appreciated that the order or sequence of performing the method as discussed above is for illustrative purposes and other orders or sequences are within the scope of the present teachings. It is to also be appreciated that the method can include other features not specifically discussed immediately above.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A connection assembly for a battery pack assembly including a battery cell, the connection assembly comprising:
 a busbar configured to be electrically connected to the battery cell, and the busbar defines a first hole;
 a circuit board defining a second hole that aligns with the first hole;
 a pin including a first body portion having a first end and a second end, and a second body portion having a first end and a second end;
 wherein the first body portion is disposed in the first hole and the second body portion is disposed in the second hole;
 wherein the first body portion defines a first eyelet between the first and second ends of the first body portion to allow the first body portion to flex as the first body portion engages the busbar inside the first hole, and the second body portion defines a second eyelet between the first and second ends of the second body portion to allow the second body portion to flex as the second body portion engages the circuit board inside the second hole;

wherein the pin electrically connects the busbar and the circuit board via the engagement of the first body portion with the busbar inside of the first hole and the engagement of the second body portion with the circuit board inside of the second hole; and a material is disposed in the second hole of the circuit board around the pin via a molding process to secure the pin to the circuit board, and the material is disposed in the first eyelet and/or the second eyelet via the molding process.

2. The connection assembly as set forth in claim 1 wherein:

the first body portion includes a first arm and a second arm connected to each other at the first and second ends of the first body portion; and the first and second arms of the first body portion surround the first eyelet.

3. The connection assembly as set forth in claim 2 wherein:

the first arm of the first body portion includes a first outer surface and the second arm of the first body portion includes a second outer surface opposing the first outer surface; and the first and second outer surfaces of the first body portion bow outwardly away from each other between the first and second ends of the first body portion.

4. The connection assembly as set forth in claim 1 wherein:

the second body portion includes a first arm and a second arm connected to each other at the first and second ends of the second body portion; and the first and second arms of the second body portion surround the second eyelet.

5. The connection assembly as set forth in claim 4 wherein:

the first arm of the second body portion includes a first outer surface and the second arm of the second body portion includes a second outer surface opposing the first outer surface; and the first and second outer surfaces of the second body portion bow outwardly away from each other between the first and second ends of the second body portion.

6. The connection assembly as set forth in claim 1 wherein the pin includes an intermediate portion disposed between the first and second body portions, with the first and second eyelets spaced from the intermediate portion.

7. The connection assembly as set forth in claim 6 wherein the intermediate portion includes a shoulder disposed between the busbar and the circuit board when the first body portion is disposed in the first hole of the busbar and the second body portion is disposed in the second hole of the circuit board.

8. The connection assembly as set forth in claim 7 wherein the shoulder is further defined as a plurality of shoulders spaced apart and opposing each other.

9. The connection assembly as set forth in claim 8 wherein each of the shoulders includes an outer periphery that faces outwardly away from the intermediate portion.

10. The connection assembly as set forth in claim 8 wherein:

the first body portion includes a first arm and a second arm connected to each other at the first and second ends of the first body portion;

the first and second arms of the first body portion surround the first eyelet;

the second body portion includes a first arm and a second arm connected to each other at the first and second ends of the second body portion;

the first and second arms of the second body portion surround the second eyelet; and one of the shoulders is disposed between the first arm of the first body portion and the first arm of the second body portion, and another one of the shoulders is disposed between the second arm of the first body portion and the second arm of the second body portion.

11. The connection assembly as set forth in claim 10 wherein:

the pin includes a pair of flat sides spaced apart and opposing each other;

the shoulders extend outwardly from the intermediate portion in a different direction from the flat sides; and the first and second arms of the first and second body portions bow outwardly in a different direction from the flat sides.

12. The connection assembly as set forth in claim 11 wherein:

the first arm of the first body portion includes a first outer surface and the second arm of the first body portion includes a second outer surface opposing the first outer surface of the first body portion;

the first and second outer surfaces of the first body portion bow outwardly away from each other between the first and second ends of the first body portion;

the first arm of the second body portion includes a first outer surface and the second arm of the second body portion includes a second outer surface opposing the first outer surface of the second body portion;

the first and second outer surfaces of the second body portion bow outwardly away from each other between the first and second ends of the second body portion; and the flat sides present a flat surface having a different configuration than the first and second outer surfaces of the first and second body portions.

13. The connection assembly as set forth in claim 1 wherein the first body portion is formed of a first pin material, and the second body portion is formed of a second pin material different from the first pin material.

14. The connection assembly as set forth in claim 1 wherein the first body portion is plated with a first pin material, and the second body portion is plated with a second pin material different from the first pin material.

15. The connection assembly as set forth in claim 14 wherein:

the pin includes an intermediate portion disposed between the first and second body portions, with the first and second eyelets spaced from the intermediate portion; and the intermediate portion has a transition zone where the first and second pin materials end.

16. A battery pack assembly comprising:

a battery cell;

a frame coupled to the battery cell;

a connection assembly mounted to the frame, and the connection assembly comprising:

a busbar attached to the frame and defining a first hole;

a circuit board attached to the frame and defining a second hole that aligns with the first hole;

a pin including a first body portion having a first end and a second end, and a second body portion having a first end and a second end;

wherein the first body portion is disposed in the first hole and the second body portion is disposed in the second hole;

wherein the first body portion defines a first eyelet between the first and second ends of the first body portion to allow the first body portion to flex as the first body portion engages the busbar inside the first hole, and the second body portion defines a second eyelet between the first and second ends of the second body portion to allow the second body portion to flex as the second body portion engages the circuit board inside the second hole;

wherein the pin electrically connects the busbar and the circuit board via the engagement of the first body portion with the busbar inside of the first hole and the engagement of the second body portion with the circuit board inside of the second hole; and a material is disposed in the second hole of the circuit board around the second body portion via a molding process to secure the pin to the circuit board, and the material is disposed in the first eyelet and/or the second eyelet via the molding process.

17. The battery pack assembly as set forth in claim 16 wherein:

the first body portion includes a first arm and a second arm connected to each other at the first and second ends of the first body portion;

the first and second arms of the first body portion surround the first eyelet;

the first arm of the first body portion includes a first outer surface and the second arm of the first body portion includes a second outer surface opposing the first outer surface;

the first and second outer surfaces of the first body portion bow outwardly away from each other between the first and second ends of the first body portion;

the second body portion includes a first arm and a second arm connected to each other at the first and second ends of the second body portion;

the first and second arms of the second body portion surround the second eyelet;

the first arm of the second body portion includes a first outer surface and the second arm of the second body portion includes a second outer surface opposing the first outer surface; and the first and second outer surfaces of the second body portion bow outwardly away from each other between the first and second ends of the second body portion.

18. The battery pack assembly as set forth in claim 16 wherein:

the pin includes an intermediate portion disposed between the first and second body portions, with the first and second eyelets spaced from the intermediate portion; and the intermediate portion includes a shoulder disposed between the busbar and the circuit board when the first body portion is disposed in the first hole of the busbar and the second body portion is disposed in the second hole of the circuit board, and the shoulder engages the frame to position the pin relative to the first hole.

19. A method of assembling a battery pack assembly, the method comprising:

molding a first material to a busbar to form a frame attached to the busbar;

inserting a first body portion of a pin into a first hole of the busbar, wherein the first body portion flexes into engagement with the busbar inside the first hole due to a first eyelet defined in the first body portion;

engaging a shoulder of the pin with the frame to maintain a position of the pin relative to the busbar once the first body portion of the pin is inserted into the first hole;

positioning a circuit board relative to the frame such that a second body portion of the pin is disposed into a second hole of the circuit board, wherein the second body portion flexes into engagement with the circuit board inside the second hole due to a second eyelet defined in the second body portion;

electrically connecting the busbar and the circuit board via the first body portion of the pin in engagement with the busbar inside of the first hole and the second body portion of the pin in engagement with the circuit board inside of the second hole; and molding a second material around the circuit board and the pin such that the second material fills the second hole of the circuit board around the second body portion to secure the pin to the circuit board, and molding the second material into the first eyelet and/or the second eyelet.

20. The method as set forth in claim 19 wherein molding a second material further comprises molding the second material around the circuit board and the pin such that the second material fills the first and second holes, which attaches the circuit board to the frame, and further comprising positioning a battery cell and the frame relative to each other, and electrically connecting the battery cell to the busbar.

* * * * *